US011687308B2

(12) United States Patent
Narita et al.

(10) Patent No.: US 11,687,308 B2
(45) Date of Patent: Jun. 27, 2023

(54) DISPLAY SYSTEM

(71) Applicant: TOYOTA JIDOSHA KABUSHIKI KAISHA, Toyota (JP)

(72) Inventors: Saki Narita, Toyota (JP); Tetsuya Kanata, Susono (JP); Yozo Iwami, Susono (JP); Daisaku Honda, Nagoya (JP); Yuhei Katsumata, Fuji (JP); Hideki Fukudome, Toyota (JP); Takuya Watabe, Hachioji (JP); Naoko Ichikawa, Tokyo-to (JP); Yuta Maniwa, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/508,156

(22) Filed: Oct. 22, 2021

(65) Prior Publication Data

US 2022/0129227 A1    Apr. 28, 2022

(30) Foreign Application Priority Data

Oct. 26, 2020   (JP) ................. 2020-178998

(51) Int. Cl.
*G06F 3/14* (2006.01)
*G06F 3/02* (2006.01)
*G06F 3/033* (2013.01)
(Continued)

(52) U.S. Cl.
CPC ............ *G06F 3/1423* (2013.01); *B60K 35/00* (2013.01); *B60K 2370/128* (2019.05);
(Continued)

(58) Field of Classification Search
CPC ........ G06F 3/1423; G06F 3/02; G06F 3/0334; G06F 2203/011; B60K 35/00;
(Continued)

(56) References Cited

U.S. PATENT DOCUMENTS

2014/0309806 A1* 10/2014 Ricci ................. G05D 23/1917
                                                        701/1
2015/0373192 A1* 12/2015 Chau ................. H04M 3/42374
                                                        370/259
(Continued)

FOREIGN PATENT DOCUMENTS

JP    H11-355748 A    12/1999
JP    2006-120136 A    5/2006
(Continued)

*Primary Examiner* — Douglas M Wilson
(74) *Attorney, Agent, or Firm* — Dinsmore & Shohl LLP

(57) ABSTRACT

There is provided, in a vehicle capable of accommodating a plurality of passengers, a display system capable of providing a motivation to start a conversation among the passengers in view of conversation intentions of each passenger. The display system includes a control device, and at least one display device. The control device is configured to perform a conversation desire display process to display a conversation desire level of each of the passengers. Alternatively, the control device is configured to perform a conversation intention display process to display a conversation intention of each of the passengers for the other passengers. The conversation desire level and the conversation intention among passengers are input to the input device provided in the display system, by an operation of the passenger. Alternatively, they are estimated by the control device based on the passenger state information detected by the sensor provided in the display system.

1 Claim, 11 Drawing Sheets

(51) Int. Cl.
*G06Q 50/00* (2012.01)
*H04M 3/42* (2006.01)
*B60K 35/00* (2006.01)

(52) U.S. Cl.
CPC .................. *B60K 2370/148* (2019.05); *B60K 2370/152* (2019.05); *G06F 3/02* (2013.01); *G06F 3/0334* (2013.01); *G06Q 50/01* (2013.01); *H04M 3/42365* (2013.01); *H04M 3/42374* (2013.01)

(58) Field of Classification Search
CPC ........ B60K 2370/128; B60K 2370/148; B60K 2370/152; B60K 2370/175; B60K 2370/184; B60K 2370/193; B60W 2540/22; G06Q 50/01; H04M 3/42365; H04M 3/42374
See application file for complete search history.

(56) References Cited

U.S. PATENT DOCUMENTS

| | | |
|---|---|---|
| 2017/0102783 A1 | 4/2017 | Shikii et al. |
| 2018/0096699 A1 | 4/2018 | Shintani et al. |
| 2019/0141176 A1* | 5/2019 | Bernard ................ H04M 3/436 |
| 2021/0092522 A1* | 3/2021 | Draper ................ B60R 11/0264 |
| 2022/0020304 A1* | 1/2022 | Couillard ............... G09G 3/035 |

FOREIGN PATENT DOCUMENTS

| | | |
|---|---|---|
| JP | 2017-064853 A | 4/2017 |
| JP | 2017-073107 A | 4/2017 |
| JP | 2018-059960 A | 4/2018 |
| JP | 2018-079778 A | 5/2018 |

* cited by examiner

EXAMPLE (A)

EXAMPLE (B)

EXAMPLE (C)

DISPLAY SYSTEM

CROSS-REFERENCE TO RELATED APPLICATION

The present disclosure claims priority under 35 U.S.C. § 119 to Japanese Patent Application No. 2020-178998, filed on Oct. 26, 2020, which is incorporated herein by reference in its entirety.

BACKGROUND

Technical Field

The present disclosure relates to a system that is mounted on a vehicle capable of accommodating a plurality of passengers, and promotes communication among the passengers in the vehicle.

Background Art

There have been proposed various techniques for promoting communication among persons riding in a vehicle.

JP 2018-59960 A discloses an information providing device that identifies excitement in conversation among passengers of a vehicle and provides more appropriate information to the passengers at a better timing based on a keyword which is expected to be of high interest to the passengers. The information providing device estimates the feeling of the passenger based on a state of the passenger. When it is determined that the feeling of the passenger corresponds to excitement, a keyword which appeared during a certain time period before the time of the determination is output by display, audio or the like. Furthermore, when the feeling of the passenger to the keyword is positive, the information associated with the keyword is output.

SUMMARY

The applicant of the present application is advancing the development of a vehicle including a pallet-like floor panel on which a passenger can ride (hereinafter, also referred to as a "pallet vehicle"). The pallet vehicle can accommodate a plurality of passengers. The passengers riding together in the pallet vehicle may be strangers to one another. In the pallet vehicle, riding places of passengers are not partitioned by seats, partitions or the like.

The applicant of the present application intends to promote communication among passengers in the pallet vehicle having such a form. In this case, it is important to provide a motivation to start a conversation. It should also be taken into account that some passengers do not want to have a conversation with other passengers who are strangers.

The conventional technique disclosed in JP 2018-59960 A is a technique for identifying excitement in a conversation that is already being conducted and providing an appropriate keyword for further continuing the conversation, but does not consider providing the motivation to start the conversation.

The present disclosure has been made in view of the above-described problem, and has an object to provide, in a vehicle capable of accommodating a plurality of passengers, a display system capable of providing a motivation to start a conversation among the passengers in view of conversation intentions of each passenger.

A first disclosure is a display system which is mounted on a vehicle capable of accommodating a plurality of passengers. The display system includes at least one display device and a control device. The control device is configured to perform a display process related to the at least one display device, and to perform a conversation desire display process to display a conversation desire level of each of the passengers.

A second disclosure further has the following aspects with the first disclosure. The at least one display device is disposed at places where each of the passengers rides and formed to allow all of the passengers to visually recognize a display. The conversation desire display process comprises displaying the conversation desire level of one passenger on the display device corresponding to the place where the one passenger rides.

A third disclosure further has the following aspects with the first disclosure. The display system further comprises at least one input device configured to accept an input of the conversation desire level by each of the passengers. The conversation desire display process comprise displaying the conversation desire level of each of the passengers based on the input to the at least one input device.

A fourth disclosure further has the following aspects with the first disclosure. The display system further comprises at least one sensor configured to detect a state of the passengers. The control device is configured to perform a conversation desire estimation process to estimate the conversation desire level of each of the passengers based on information detected by the at least one sensor.

A fifth disclosure is a display system which is mounted on a vehicle capable of accommodating a plurality of passengers. The display system includes at least one display device and a control device. The control device is configured to perform a display process related to the at least one display device, and to perform a conversation intention display process to display a conversation intention of each of the passengers for the other passengers.

A sixth disclosure further has the following aspects with the fifth disclosure. The at least one display is formed to allow only a certain passenger corresponding to the display device to visually recognize the display. The conversation intention display process comprises displaying the conversation intention of each of the passengers for the certain passenger on the display device corresponding to the certain passenger.

A seventh disclosure further has the following aspects with the fifth disclosure. The display system further comprises at least one input device configured to accept an input of the conversation intention by each of the passengers. The conversation intention display process comprises displaying the conversation intention of each of the passengers for the other passengers based on the input to the at least one input device.

An eighth disclosure further has the following aspects with the fifth disclosure. The display system further comprises at least one sensor configured to detect a state of the passengers. The control device is configured to perform a conversation intention estimation process to estimate the conversation intention among the passengers based on information detected by the at least one sensor.

According to a display system according to the present disclosure, each of the passengers can know the conversation desire level of the other passengers or the conversation intention of the other passengers. In addition, it is possible to inform the other passengers about own the conversation desire level or own conversation intention. This can provide a motivation to start a conversation among passengers riding together in the vehicle and can take into account the conversation intention among passengers.

EMBODIMENTS

Figure 1:
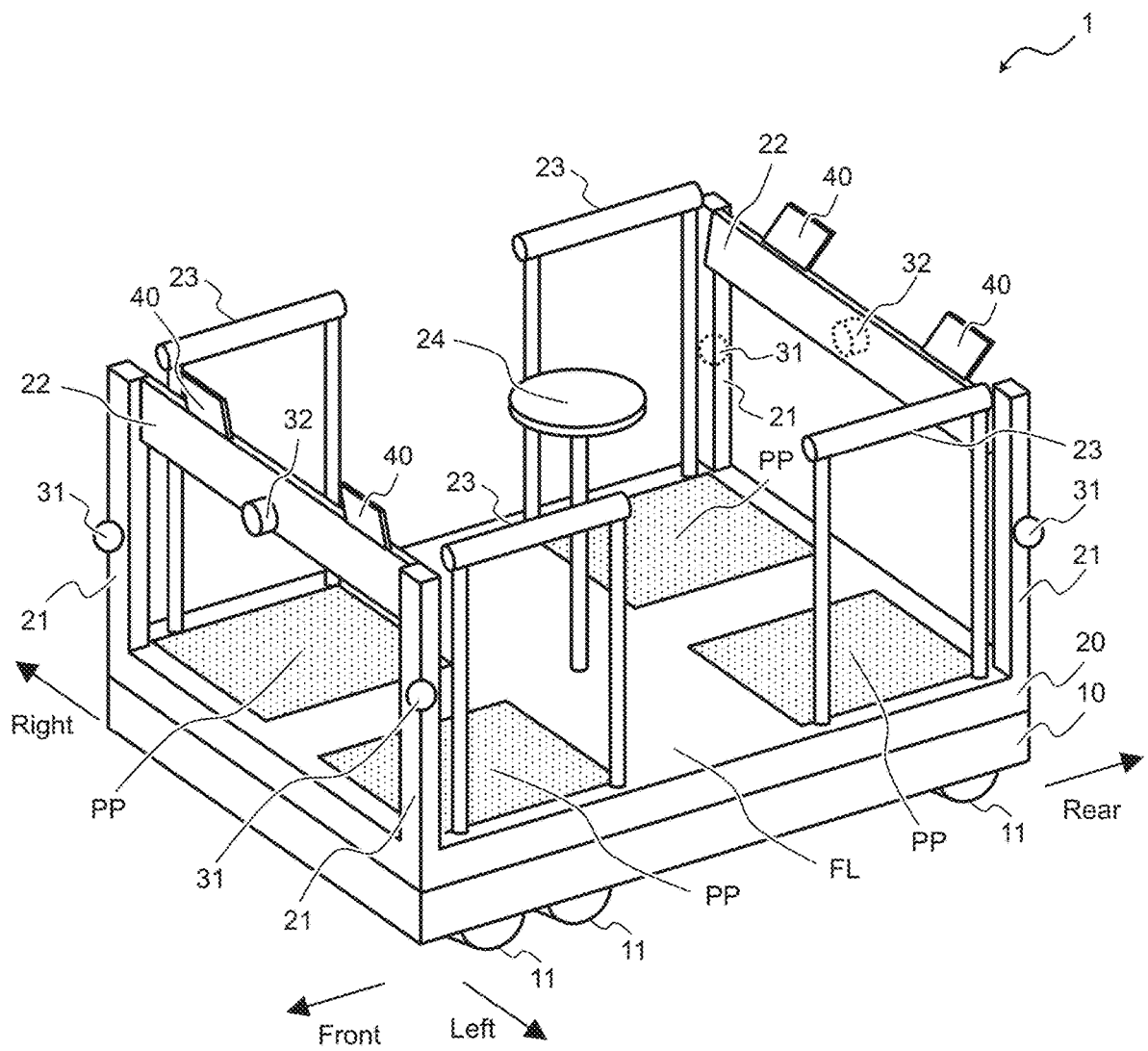
FIG. 1 is a perspective view illustrating an example of a vehicle on which the display system according to the present embodiment is mounted.

Hereinafter, embodiments of the present disclosure will be described with reference to the drawings. It is to be understood that even when the number, quantity, amount, range, or other numerical attribute of each element is mentioned in the following description of the embodiments, the present disclosure is not limited to the mentioned numerical attribute unless explicitly described otherwise, or unless the present disclosure is explicitly specified by the numeral attribute theoretically. Furthermore, structures or the like that are described in conjunction with the following embodiments are not necessarily essential to the present disclosure unless explicitly shown otherwise, or unless the present disclosure is explicitly specified by the structures or the like theoretically. In addition, in the drawings, the same reference sign or numeral will be given to the same or equivalent component, and the repetitive description thereof will be appropriately simplified or omitted.

1. Pallet Vehicle

Figure 2:
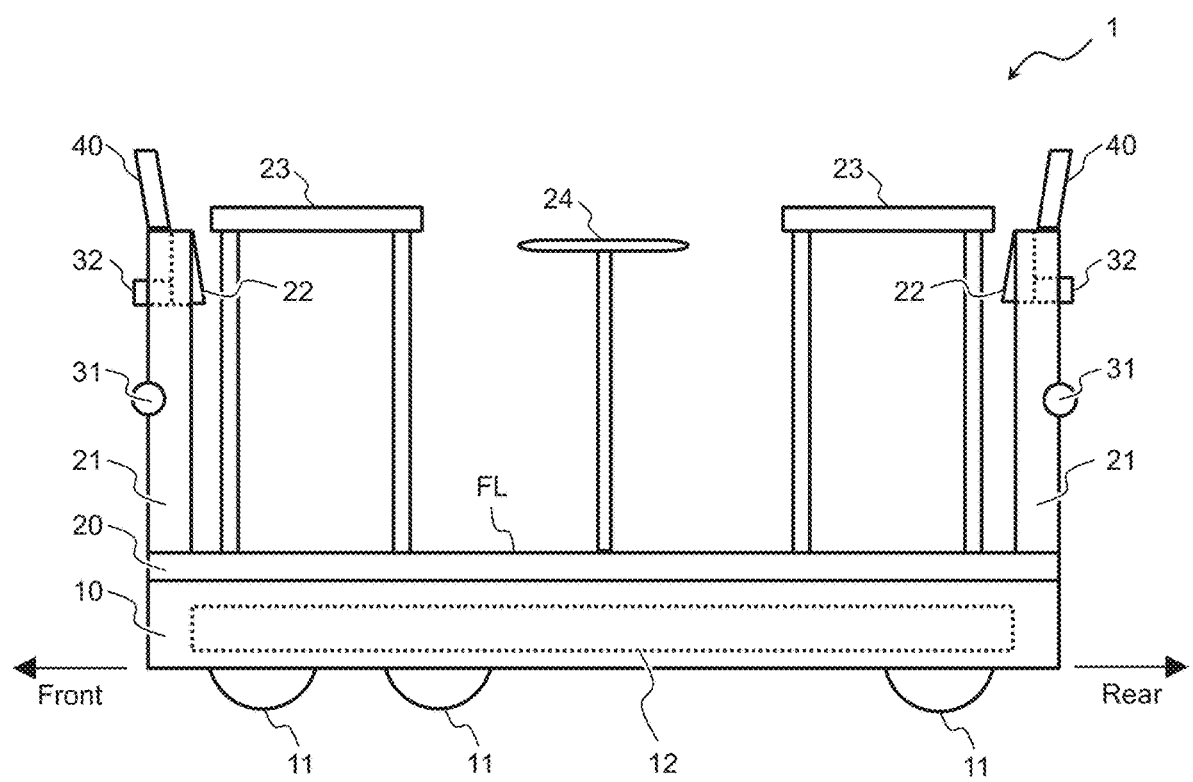
FIG. 2 is a side view of the vehicle illustrated in FIG. 1.

A display system according to the present embodiment is mounted on a vehicle capable of accommodating a plurality of passengers. FIG. 1 is a perspective view illustrating an example of a vehicle 1 on which the display system according to the present embodiment is mounted. FIG. 2 is a side view of the vehicle 1 illustrated in FIG. 1. The vehicle 1 is a small vehicle that can travel while carrying passengers. The vehicle 1 can be also referred to as a cart, a pallet, or the like. Typically, the vehicle 1 can travel autonomously. However, the vehicle 1 does not have to be an autonomous vehicle. For example, the vehicle 1 may travel under remote operation by a remote operator. In the following description, it is assumed that the vehicle 1 can travel autonomously. The vehicle 1 is also referred to as a pallet vehicle 1.

The pallet vehicle 1 includes a truck 10. The truck 10 has a plurality of wheels 11, and provides a traveling function of the pallet vehicle 1.

The pallet vehicle 1 includes a pallet-like floor panel 20. A floor surface FL is an upper surface of the floor panel 20. A passenger rides on the floor surface FL. In this sense, the floor surface FL can be also referred to as a riding surface, a deck, or the like. The floor surface FL has a height to such an extent that a passenger can easily get on or off the floor surface FL, and is located at a height of about 30 cm above the ground, for example.

A passenger place PP which is a place on which a passenger can ride is indicated on the floor surface FL. The passenger place PP is indicated in a color different from that of the other portion of the floor surface FL, for example. Alternatively, the passenger place PP may be indicated by a specific mark. A passenger basically rides on the place indicated by the passenger place PP. In an example of the pallet vehicle 1 illustrated in FIGS. 1 and 2, the passenger capacity is four persons.

A space above the floor surface FL is a riding space for passengers. In the example illustrated in FIGS. 1 and 2, support pillars 21 are set up at four corners of the floor panel 20. The support pillars 21 may be set up separately from the floor panel 20 or may be formed integrally with the floor panel 20. A backrest 22 is provided between the left and right support pillars 21. A passenger can lean against the backrest 22. A handrail 23 is provided in the vicinity of each passenger place PP. The passenger can hold on the handrail 23. Furthermore, a convenient table 24 may be set at a center of the floor surface FL. Such a riding space illustrated in FIGS. 1 and 2 is one example, and the riding space may have any configuration.

The pallet vehicle 1 includes several recognition sensors. A camera 31 captures an image of surrounding circumstances of the pallet vehicle 1. For example, four cameras 31 that are attached to the respective four support pillars 21 capture right front, left front, right rear, and left rear images of the pallet vehicle 1, respectively. A light detection and ranging (LIDAR) 32 detects an object around the pallet vehicle 1. For example, two LIDARs that are attached to the front backrest 22 and the rear backrest 22 of the pallet vehicle 1, respectively, detect an object in front of the pallet vehicle 1 and an object behind the pallet vehicle 1.

The pallet vehicle 1 may also include a human machine interface (HMI) unit 40. The HMI unit 40 provides information to the passenger and receives information from the passenger. Examples of the HMI unit 40 include a tablet, a touch panel, and the like, and is provided in the vicinity of each passenger place PP.

The pallet vehicle 1 further includes a telecommunication device not illustrated in FIGS. 1 and 2. The telecommunication device is provided at any place. The telecommunication device performs telecommunication with the outside of the pallet vehicle 1. Examples of the telecommunication device include a device for performing vehicle-to-vehicle communication or road-to-vehicle communication, a device having a global positioning system (GPS) function, a device for performing telecommunication with a user terminal owned by a passenger (may include a person who is not onboard), and the like. This can acquire telecommunication information including map information, position information about the pallet vehicle 1 on a map and information about a passenger. On the other hand, the telecommunication device may transmit, to the outside, the information about the vehicle state of the pallet vehicle 1 and the like. These telecommunications are performed through a wireless communication network, for example. In this case, the pallet vehicle 1 may be configured to telecommunicate with an external management server so that the management server can telecommunicate with the other vehicles and passengers.

The pallet vehicle 1 travels autonomously under autonomous travel control performed using driving environment information, map information and the like that are acquired from the recognition sensors and the telecommunication device.

The truck 10 includes a control unit 12. The control unit 12 is configured by various devices associated with operations of the pallet vehicle 1, and includes an inertial measurement unit (IMU), a control device, a motor controller, a motor, and a battery.

The IMU is a sensor that detects three-axis angular velocity and three-axis acceleration. This can acquire traveling conditions including velocity, acceleration and attitude of the pallet vehicle 1.

The control device performs processes related to various controls for the pallet vehicle 1, and generates and outputs signals. For example, the control device performs the autonomous travel control, generates a control signal for performing autonomous travel, and outputs it to a motor controller.

Typically, the control device is a computer including a memory and a processor. The memory includes a random access memory (RAM) that temporarily records data, and a read only memory (ROM) that stores control programs being executable by a processor and various data related to the control programs. The processor reads programs from the memory and performs processes according to programs based on various data read from the memory.

The motor controller drives a motor according to the control signal generated by the control device. The motor is an electric motor adapted to be rotated by the supplied electric power. Examples of the motor include a brushless DC motor, and a synchronous motor.

The battery is electrically connected to each device included in the pallet vehicle 1 and supplies electric power to each device. Typically, the battery is a rechargeable DC power source such as a lithium battery or a nickel hydrogen battery, and is charged with an external power source of the pallet vehicle 1. The battery may be charged by the regenerative energy of the wheels 11.

Figure 3:
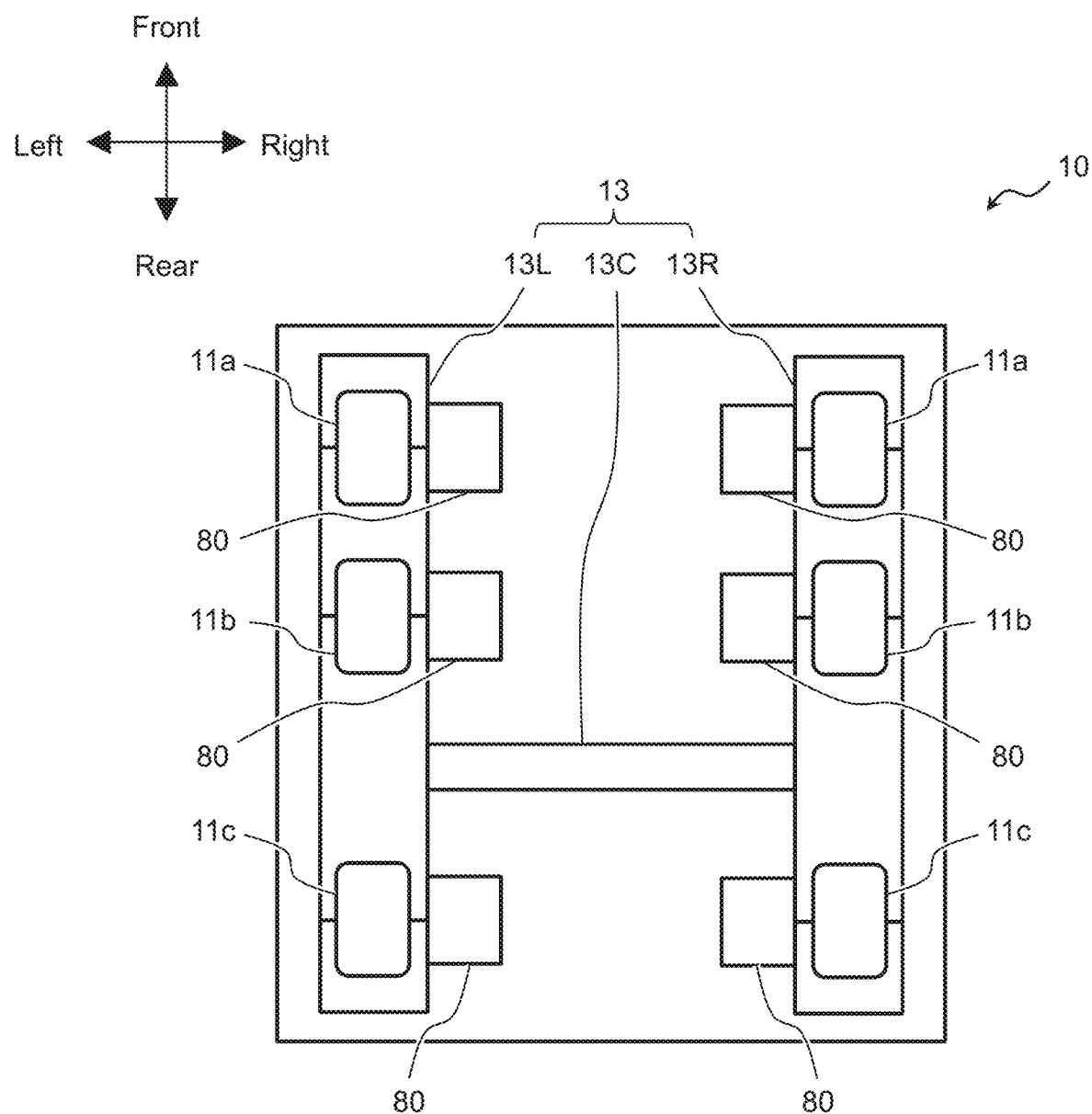
FIG. 3 is a planar view schematically illustrating a configuration example of the truck.

FIG. 3 is a planar view schematically illustrating a configuration example of the truck 10. The truck 10 includes a frame 13. Among the devices included in the control unit 12 of the truck 10, motors 80 are illustrated in the figure. A plurality of wheels 11 are attached to the frame 13.

The plurality of wheels 11 include front wheels 11a, middle wheels 11b, and rear wheels 11c. There are provided left and right side front wheels 11a, left and right side middle wheels 11b, and left and right side rear wheels 11c. The left side front wheel 11a, the left side middle wheel 11b, and the left side rear wheel 11c are attached to a left frame 13L. The right side front wheel 11a, the right side middle wheel 11b, and the right side rear wheel 11c are attached to a right frame 13R. A connecting frame 13C connects the left frame 13L with the right frame 13R.

The plurality of wheels 11 are independently drivable by the rotary motion of a plurality of motors 80. The motors 80 are controlled by the control device and the motor controller which are not illustrated in FIG. 3, which causes the pallet vehicle 1 to be accelerated, decelerated, or turned.

For example, the motors 80 are controlled so that the rotation speed of the wheels 11 is increased or decreased, whereby the pallet vehicle 1 can be accelerated or decelerated. The pallet vehicle 1 may be decelerated using a regenerative brake of the motors 80. Alternatively, a brake mechanism may be provided for the wheels 11 so that the brake is used to decelerate the pallet vehicle 1.

For example, the motors 80 are controlled to create a difference in the rotation speed of the left and right wheels 11, whereby the pallet vehicle 1 can be turned. The front wheels 11a and the rear wheels 11c may be composed of Omni wheels to increase the degree of freedom of turning of the pallet vehicle 1.

As another example, a steering mechanism may be provided for the front wheels 11a, so that the vehicle 1 can be turned by steering the front wheels 11a. Alternatively, the steering mechanism may be provided for each wheel 11 so that the vehicle 1 can move in parallel. In this case, the vehicle 1 moves in parallel in a specific direction, without being turned.

2. First Embodiment

Hereinafter, there will be described a case where a display system according to a first embodiment is applied to the pallet vehicle 1 in FIGS. 1 and 2.

2-1. Display System According to First Embodiment

Figure 4:
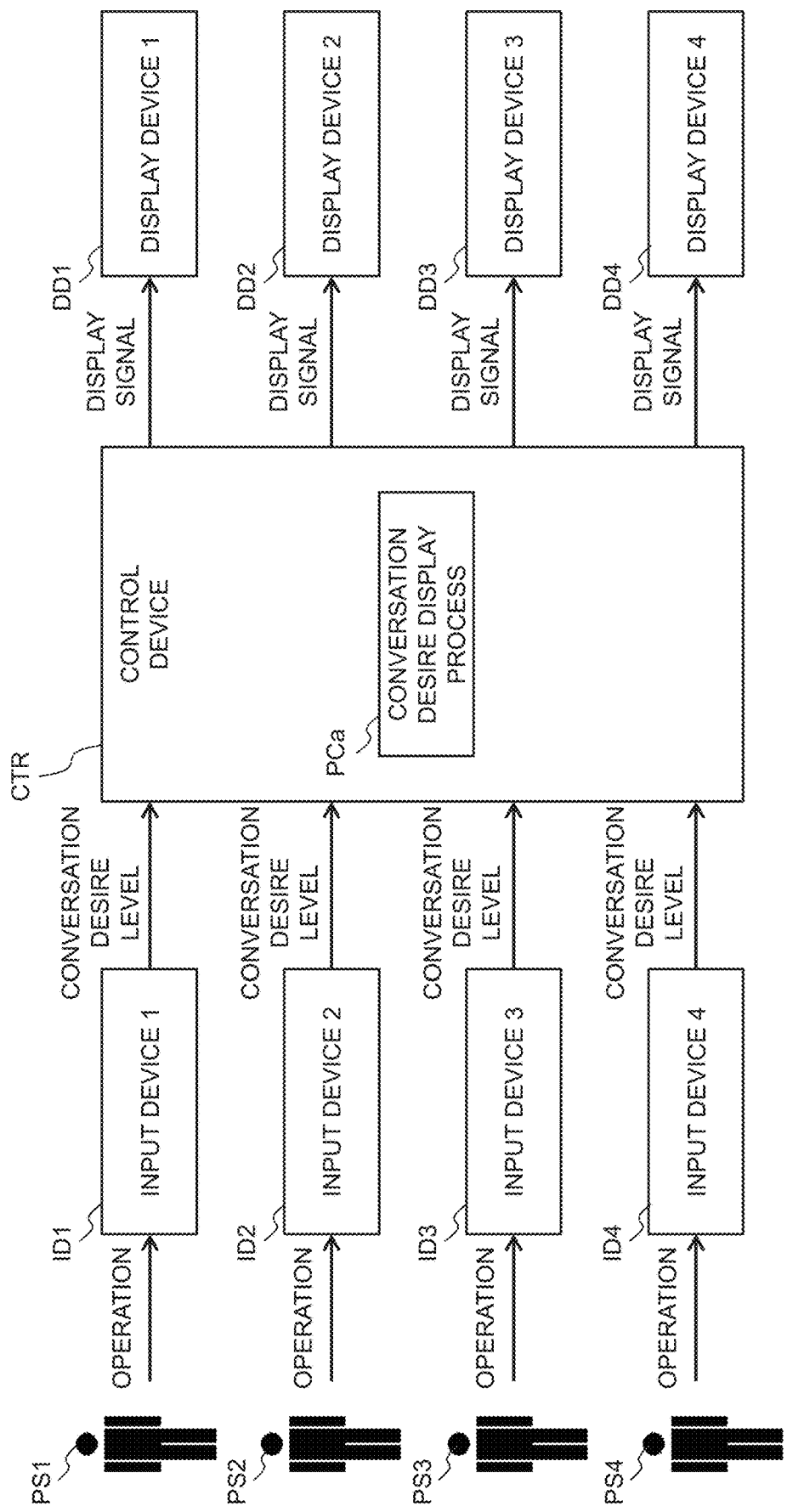
FIG. 4 is a block diagram illustrating a configuration example of a display system according to the first embodiment.

FIG. 4 is a block diagram illustrating a configuration example of a display system 100 according to the first embodiment. The display system 100 includes a plurality of input devices ID, a control device CTR, and a plurality of display devices DD. Each input device ID and each display device DD are electrically or wirelessly connected to the control device CTR so that signals can be transmitted. The display system 100 according to the first embodiment displays a conversation desire level of each passenger PS riding on the pallet vehicle 1 on the corresponding display device DD. Here, the term "conversation desire level" refers to a level of desire for a conversation of the passenger PS, and represents the feeling of "wanting to have a conversation" or "not wanting to have a conversation."

In FIG. 4, the number is suffixed to each reference sign of the input devices ID to distinguish among the individual input devices ID. The same applies to the display devices DD and the passengers PS. The number of input devices ID and the number of display devices DD which are included in the display system 100 according to the first embodiment are four according to the number of passenger places PP of the pallet vehicle 1, but are not limited to four. The control device CTR included in the display system 100 may be the same as the control device included in the above-described control unit 12 or may be provided separately.

The input device ID is a device to accept an input of the conversation desire level of the passenger PS by an operation of the passenger PS. The input device ID transmits the input conversation desire level to the control device CTR.

Figure 5:
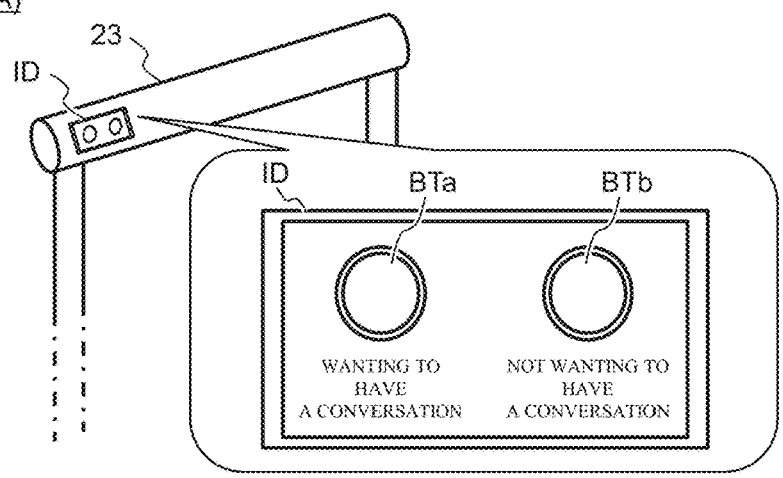
FIG. 5 is a conceptual diagram illustrating examples of forms of the input device.
Figure 5:
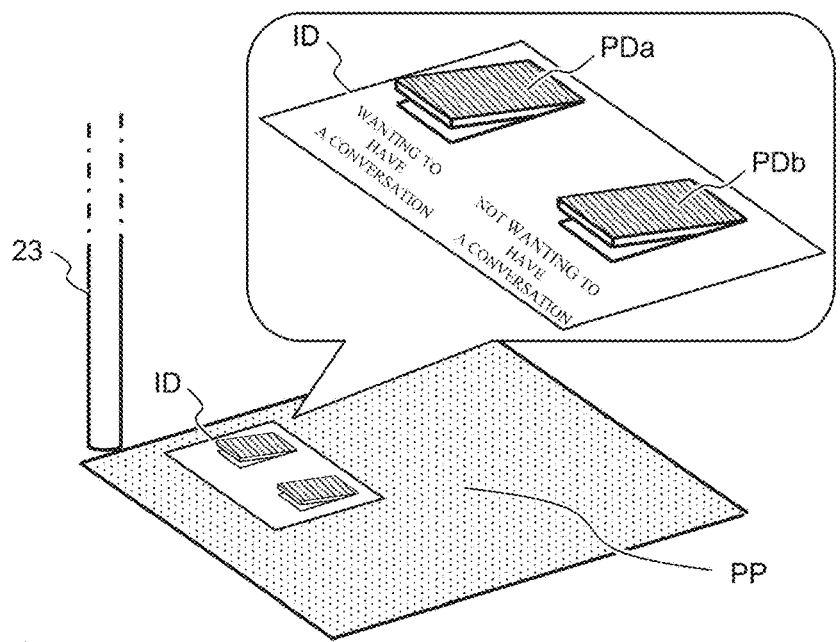
Figure 5:
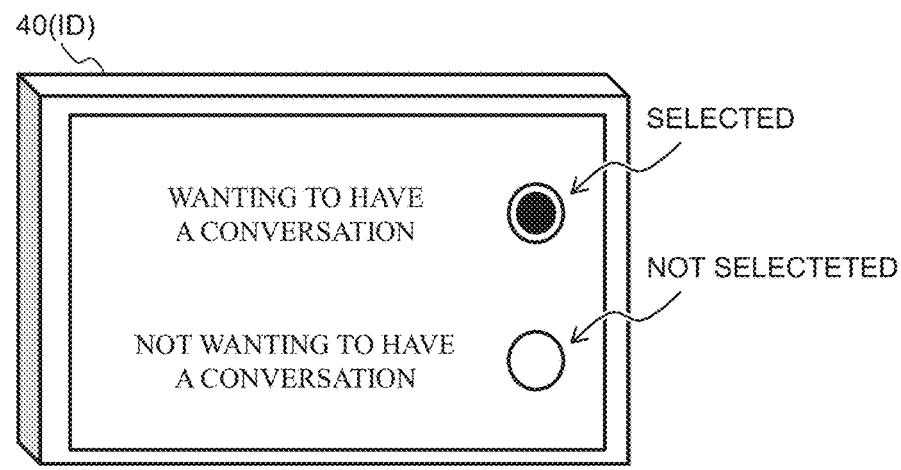

The input device ID may be of any form. FIG. 5 is a conceptual diagram illustrating examples of forms of the input device ID.

A first example (A) of the input device ID shows an example in which an input device ID is provided in a handrail 23. The input device ID is provided in each handrail 23 included in the pallet vehicle 1. That is, each passenger PS operates the input device ID provided in the handrail 23 in the vicinity of the passenger place PP on which the passenger PS is riding. The input device ID has two buttons BTa and BTb. The button BTa is a button corresponding to the conversation desire level of "wanting to have a conversation." The button BTb is a button corresponding to the conversation desire level of "not wanting to have a conversation." The passenger PS presses the button BTa when having the feeling of "wanting to have a conversation," or presses the button BTb when having the feeling of "not wanting to have a conversation," whereby the passenger PS can input the conversation desire level of himself or herself.

The number of buttons may be increased to increase the number of patterns of conversation desire levels to be input. For example, the level of the feeling of "wanting to have a conversation" may be expressed by five steps, and five buttons may be provided on the input device ID. In addition, each button may be different in color, shape or the like to distinguish among the buttons.

A second example (B) of the input device ID shows an example in which an input device ID is provided on a passenger place PP. The input device ID is provided in each passenger place PP included in the pallet vehicle 1. That is, each passenger PS operates the input device ID provided on the passenger place PP on which the passenger PS is riding. The input device ID has two pedals PDa and PDb. The pedal PDa is a pedal corresponding to the conversation desire level of "wanting to have a conversation." The pedal PDb is a pedal corresponding to the conversation desire level of "not wanting to have a conversation." The passenger PS steps on the pedal PDa when having the feeling of "wanting to have a conversation," or steps on the pedal PDb when having the feeling of "not wanting to have a conversation," whereby the passenger PS can input the conversation desire level of himself or herself.

The number of pedals may be increased to increase the number of patterns of conversation desire levels to be input. In addition, each pedal may be different in color, shape or the like to distinguish among the pedals.

A third example (C) of the input device ID shows an example in which an HMI unit 40 functions as the input device ID. In this case, each HMI unit 40 included in the pallet vehicle 1 functions as the input device ID. That is, each passenger PS operates the HMI unit 40 (input device ID) provided in the vicinity of the passenger place PP on which the passenger PS is riding. On the HMI unit 40 (input device ID), options of "wanting to have a conversation" and "not wanting to have a conversation" are displayed. The passenger PS can input the conversation desire level of himself or herself by selecting "wanting to have a conversation" or "not wanting to have a conversation." For example, in FIG. 5, the option of "wanting to have a conversation" is selected.

The number of options may be increased to increase the number of patterns of conversation desire levels to be input. Alternatively, it is acceptable that the conversation desire level can be input as continuous levels. For example, it is acceptable that the level of the feeling of "wanting to have a conversation" can be represented by inputting continuous numerical values from zero (the lowest desire level) to 100 (the highest desire level).

As other examples of the input device ID, a terminal (smartphone or the like) owned by the passenger PS may be used as the input device ID. Each passenger PS inputs the conversation desire level of himself or herself by operating the terminal (input device ID) owned by himself or herself. For example, the passenger PS installs an application corresponding to the display system 100 in the terminal, which causes the terminal to function as the input device ID. In this case, the operation on the application by the passenger PS is equivalent to that described in the third example (C) of the input device ID, for example.

An input device ID may be configured by combining the above-described examples of the input devices ID. For example, a configuration may be adopted in which an input device ID is provided in the handrail 23 as shown in the first example (A) of the input device ID and an HMI unit 40 can function as the input device ID as shown in the third example (C) of the input device.

Referring again to FIG. 4, the control device CTR performs a conversation desire display process PCa, and generates and outputs a display signal for performing a display on the display device DD. More specifically, the processor of the control device CTR reads the programs related to the conversation desire display process PCa from the memory and performs the conversation desire display process PCa based on the conversation desire level transmitted from the input device ID and stored in the memory. Then, a display signal for displaying the conversation desire level is generated, and the display signal is output to each of the corresponding display device DD. Here, the display signal is generated so that the conversation desire level indicated by the display on the display device DD corresponds to the conversation desire level transmitted from the input device ID.

The control device CTR may always perform a display by repeatedly performing the conversation desire display process PCa at every predetermined control cycle or may perform a display by performing the conversation desire display process PCa at a specific timing. For example, the control device CTR performs the conversation desire display process PCa when the pallet vehicle 1 travels in a particular location, based on the driving environment information, the map information and the like that are acquired from the recognition sensors or the telecommunication device. In this case, the control device CTR is configured to be capable of transmitting signals with the recognition sensors or the telecommunication device.

Figure 6:
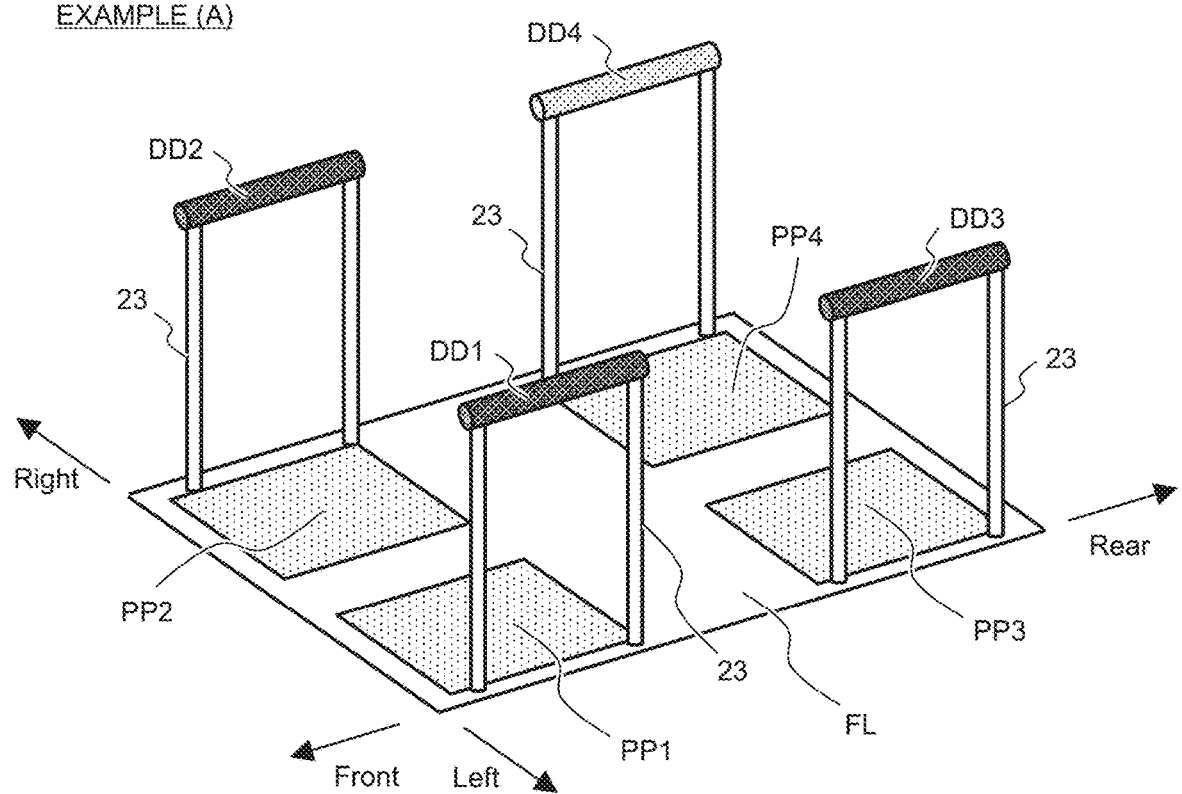
FIG. 6 is a conceptual diagram illustrating examples of the forms of and the displays on the display devices.
Figure 6:
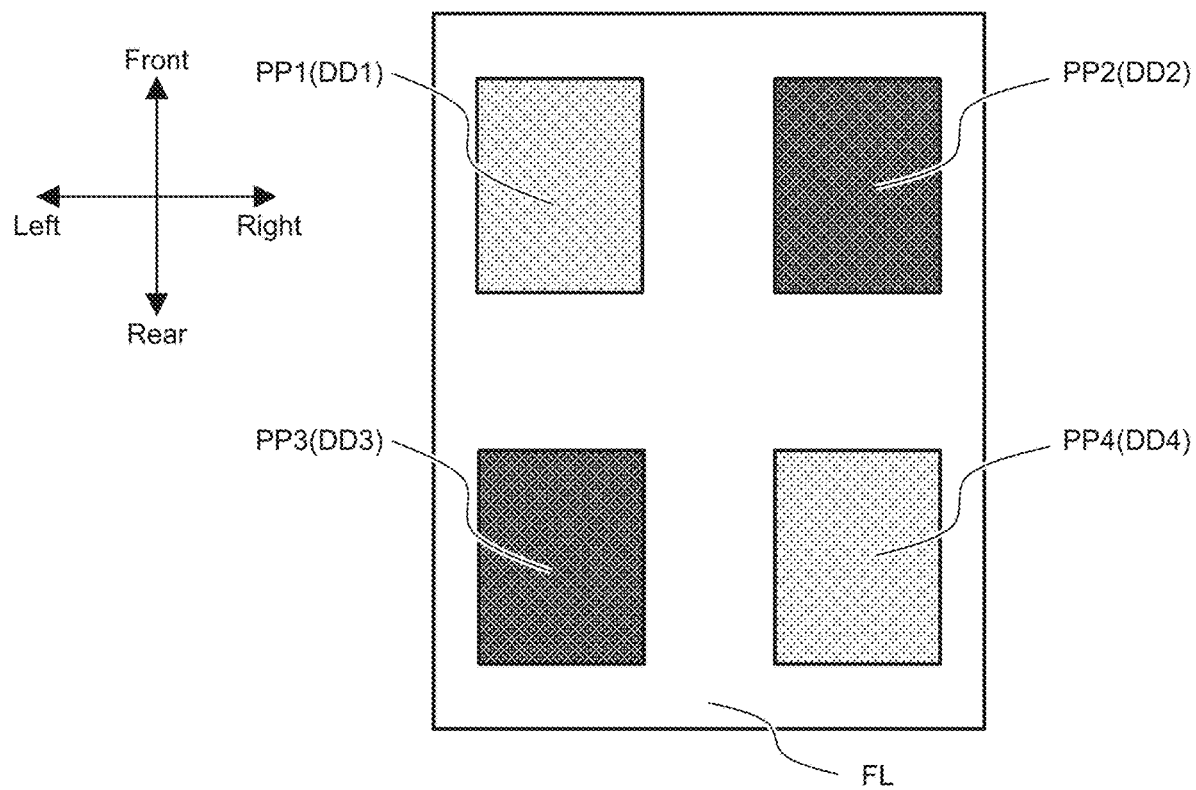
Figure 7:
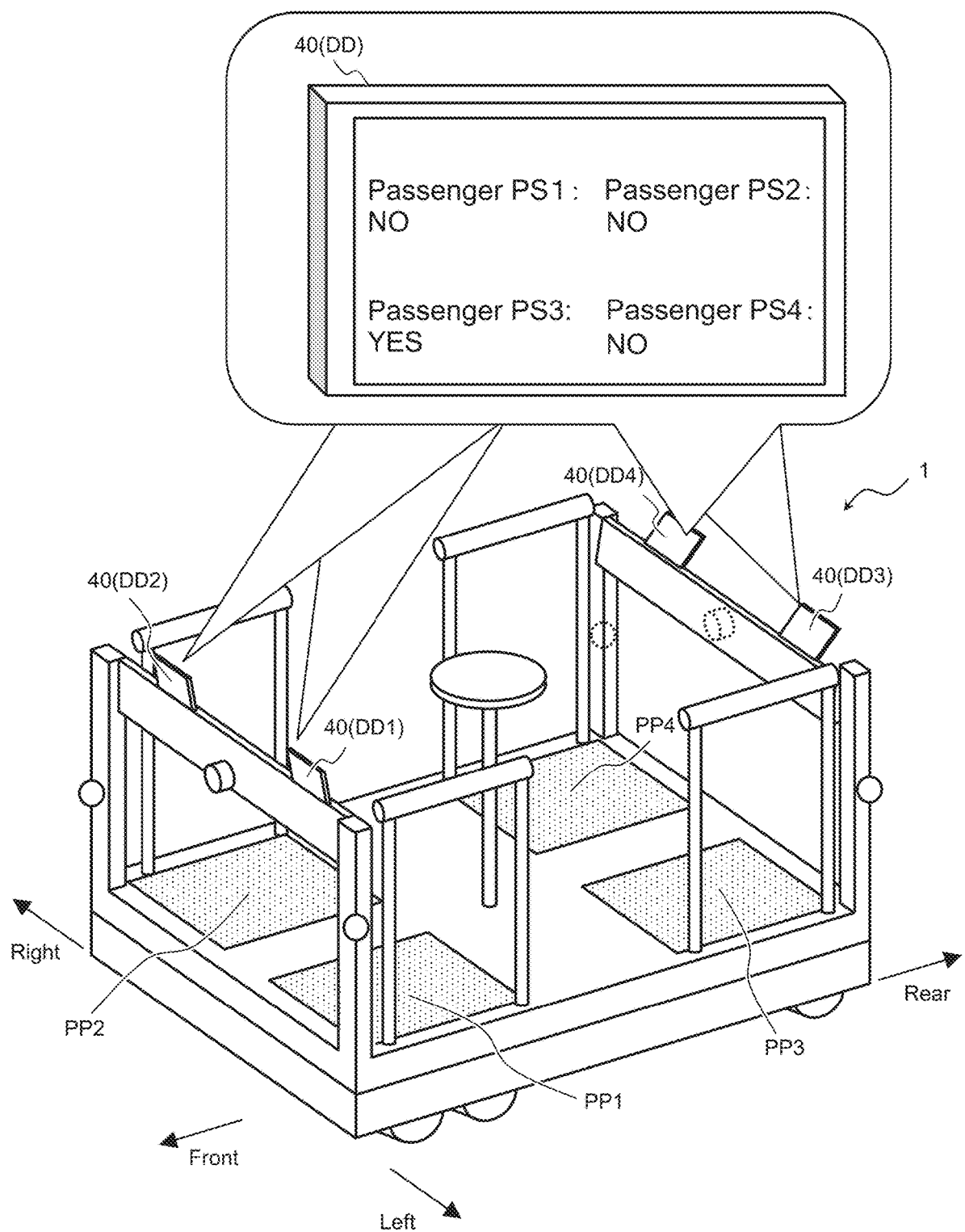
FIG. 7 is a conceptual diagram illustrating examples of the forms of and the displays on the display devices.

The display device DD performs a display according to the display signal output from the control device CTR. The display devices DD may be of any form and perform any display provided that the display devices DD can indicate the conversation desire level and allow all of the passengers PS riding in the pallet vehicle 1 to visually confirm the conversation desire levels of the respective passengers PS. FIGS. 6 and 7 are conceptual diagrams illustrating examples of the forms of and the displays on the display devices DD.

In FIGS. 6 and 7, it is assumed that four passengers PS can be accommodated in the pallet vehicle 1, and the four passengers PSi (i=1, 2, 3, and 4) ride on the four passenger places PPi (i=1, 2, 3, and 4), respectively. For example, a passenger who rides on a passenger place PP2 is referred to as a passenger PS2.

A first example (A) of the display devices DD shows an example in which a grip portion of the handrail 23 serves as the display device DD. For an illustrative purpose, the first example of the display devices DD shows only a portion of the pallet vehicle 1. In the first example (A) of the display devices DD, the reference sign of the display device DD of the handrail 23 provided in the vicinity of the passenger place PPi (i=1, 2, 3, or 4) is assigned as DDi (i=1, 2, 3, or 4).

These display devices DD each indicate the conversation desire level by displaying a color corresponding to the conversation desire level. For example, the display device DD displays yellow to indicate the conversation desire level of "wanting to have a conversation," and displays blue to indicate the conversation desire level of "not wanting to have a conversation." Examples of the display device DD include an LED, and a liquid crystal display. Note that the display indicating the conversation desire level of the passenger PSi is displayed on the display device DDi. That is, the control device CTR outputs, to the display device DDi, the display signal for indicating the conversation desire level of the passenger PSi. For example, the control device CTR outputs, based on the conversation desire level input by the input device ID to be operated by the passenger PS2 (for example, the input device ID placed on the passenger place PP2), the display signal for displaying the color indicative of the conversation desire level to the display device DD2.

In the first example (A) of the display devices DD shown in FIG. 6, the display device DD displays a dark color to indicate the conversation desire level of "wanting to have a conversation," and displays a light color to indicate the conversation desire level of "not wanting to have a conversation." In this case, the passengers PS1, PS2, and PS3 have the conversation desire level of "wanting to have a conversation," and the passenger PS4 has the conversation desire level of "not wanting to have a conversion."

Note that the grip portions of the handrails 23 have sufficient size or length so that all of the passengers PS riding in the pallet vehicle 1 can visually recognize and confirm the displays on the display devices DD.

A second example (B) of the display devices DD shows an example in which a passenger place PPi serves as a display device DDi. The second example (B) of the display devices DD illustrates a top view of the floor surface FL, and shows only a portion of the pallet vehicle 1.

These display devices DD each indicate the conversation desire level by displaying a color corresponding to the conversation desire level, as in the first example (A) of the display devices DD. Note that the display indicating the conversation desire level of the passenger PSi is displayed on the passenger place PPi (display device DDi).

In the second example (B) of the display devices DD shown in FIG. 6, the passenger place PP (display device DD) displays a dark color to indicate the conversation desire level of "wanting to have a conversation," and displays a light color to indicate the conversation desire level of "not wanting to have a conversation." In this case, the passengers PS2 and PS3 have the conversation desire level of "wanting to have a conversation," and the passengers PS1 and PS4 have the conversation desire level of "not wanting to have a conversion."

Note that the passenger places PP (display devices DD) have sufficient size so that all of the passengers PS riding in the pallet vehicle 1 can visually recognize and confirm the displays of the color on the passenger places PP (display devices DD).

In the first example (A) and the second example (B) of the display devices DD, when there are more conversation desire levels to be indicated or when the conversation desire levels are continuous, the number of patterns of colors to be displayed may be increased so that the conversation desire levels can be appropriately indicated. Alternatively, the continuously changing colors may be displayed according to the continuous conversation desire levels.

In addition, in the first example (A) and the second example (B) of the display devices DD, the display device DD may perform the display indicating the conversation desire level using characters, signs, numerical values, or the like, or a combination thereof.

As described above, in the examples shown in the first example (A) and the second example (B) of the display devices DD, each display device DD is placed in the corresponding passenger place PP, and the display indicating the conversation desire level of each passenger PS is displayed on the display device DD placed in the passenger place PP of the passenger PS.

A third example (C) of the display device DD shows an example in which an HMI unit 40 functions as a display device DD. Each of the HMI units 40 included in the pallet vehicle 1 functions as the display device DD. In the third example (C) of the display device DD, the reference sign of the display device DD provided in the vicinity of the passenger place PPi (i=1, 2, 3, or 4) is assigned as DDi (i=1, 2, 3, or 4).

The HMI unit 40 (display device DD) performs the display indicating the conversation desire levels of the respective passenger PS. As illustrated in FIG. 7, "YES" is displayed in the column of the passenger PS having the conversation desire level of "wanting to have a conversation," and "NO" is displayed in the column of the passenger PS having the conversation desire level of "not wanting to have a conversation." Each of the HMI units 40 (display devices DD) displays the conversation desire levels of the respective passengers PS. In the third example (C) of the display device DD, the passenger PS3 has the conversation desire level of "wanting to have a conversation," and the passengers PS1, PS2, and PS4 have the conversation desire levels of "not wanting to have a conversation."

When there are more conversation desire levels to be indicated or when the conversation desire levels are continuous, an appropriate display form may be adopted so that the conversation desire levels can be appropriately indicated. For example, in the case where the continuous conversation desire levels are represented by continuous numerical values from zero (the lowest desire level) to 100 (the highest desire level), when the numerical value is 60, the "conversation desire level 60%" is displayed.

The display indicating the conversation desire level is not limited to the display shown in the third example (C) of the display device DD, and may be shown using colors, characters, signs, numerical values, or the like, or a combination thereof.

As other examples of the display device DD, a terminal (smartphone or the like) owned by the passenger PS may be used as the display device DD. In this case, the display indicating the conversation desire level of each passenger PS is displayed on the terminal (display device DD) owned by the passenger PS. For example, the passenger PS installs an application corresponding to the display system 100 in the terminal, which causes the terminal to function as the display device DD. In this case, the display on the application is equivalent to that described in the third example (C) of the display device DD, for example.

A display device DD may be configured by combining the above-described examples of the display devices DD. For example, a configuration may be adopted in which the grip portion of the handrail 23 serves as the display device DD as shown in the first example (A) of the display devices DD and the passenger place PP serves as the display device DD as shown in the second example (B) of the display devices.

In addition, a configuration may be adopted to perform a display indicating the conversation desire levels of only some of the passengers PS riding in the pallet vehicle 1. For example, a configuration may be adopted in which a display indicating the conversation desire levels of the passengers PS riding on the passenger places PP1 and PP2 is performed, but a display indicating the conversation desire levels of the passengers PS riding on the passenger places PP3 and PP4 is not performed. Alternatively, assuming that five or more passengers PS can be accommodated in the pallet vehicle 1, a configuration may be adopted to perform a display indicating the conversation desire levels of only passengers PS riding on the passenger places PPi (i=1, 2, 3, and 4).

Thus, the display system 100 according to the first embodiment can inform the other passengers PS about the conversation desire level of each passenger PS. This can provide a motivation to start a conversation among passengers riding together in the vehicle. On the other hand, the display system 100 can inform the other passengers PS about an intention of "not wanting to have a conversation."

2-2. Modified Example

The display system 100 according to the first embodiment may adopt a modified aspect as follows.

Figure 8:
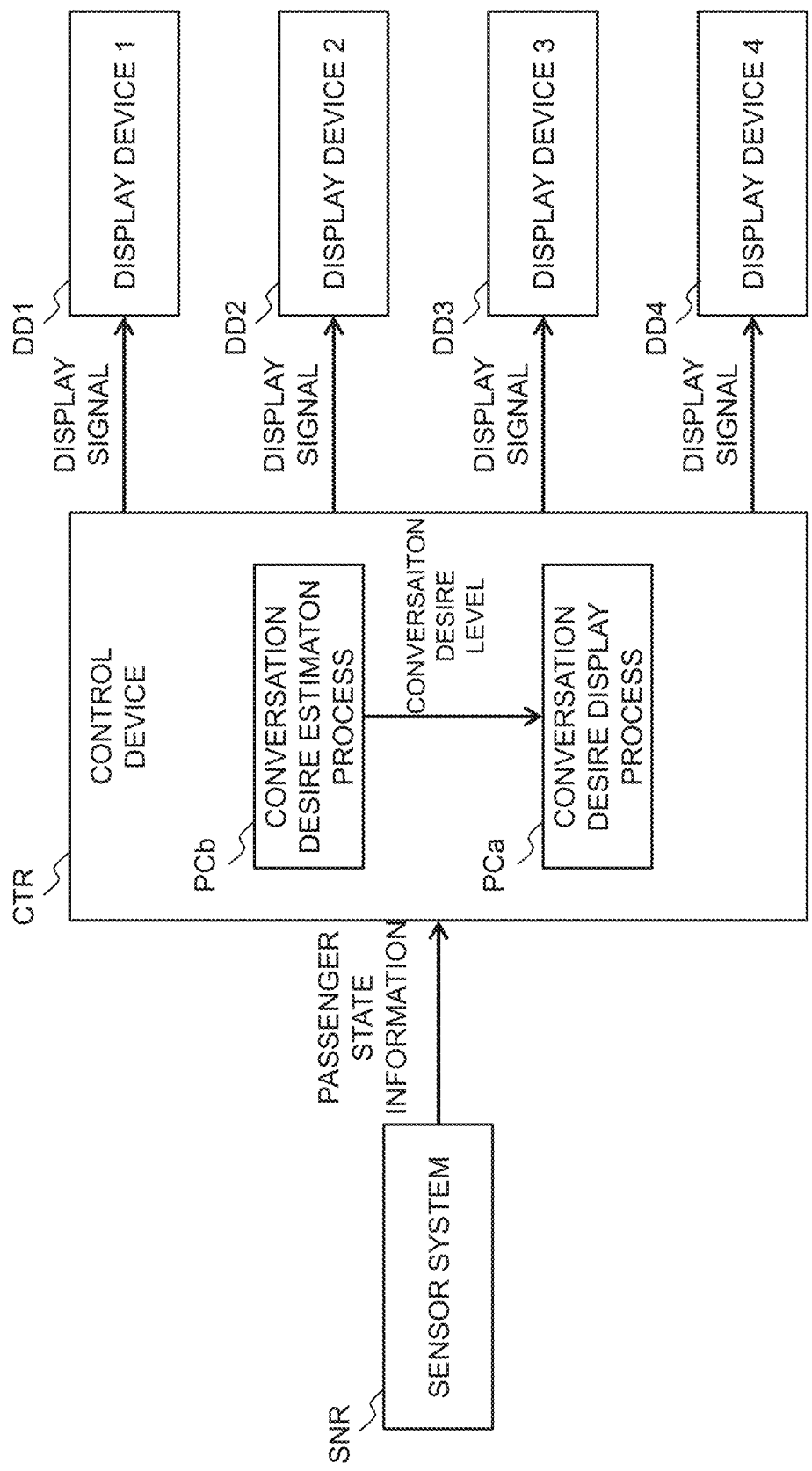
FIG. 8 is a block diagram illustrating a configuration example of a display system according to a modified example of the first embodiment.

The display system 100 according to the first embodiment may be configured to estimate the conversation desire level of each passenger PS. FIG. 8 is a block diagram illustrating a configuration example of a display system 100 according to a modified example of the first embodiment. The display system 100 according to the modified example of the first embodiment is different from the configuration example illustrated in FIG. 4 in that no input devices ID are provided and a sensor system SNR is provided. Here, the sensor system SNR is a collection of sensors including one or a plurality of sensors. In addition, the control device CTR performs the conversation desire estimation process PCb.

Each of the sensors included in the sensor system SNR detects a state of the passenger PS (passenger state) riding in the pallet vehicle 1. Each of the sensors included in the sensor system SNR is configured to be capable of transmitting a signal together with the control device CTR, and transmits the passenger state information to the control device.

Examples of the sensors included in the sensor system SNR include a camera, and a biosensor. The camera is placed to be capable of capturing an image of the passenger PS, and detects the passenger state based on image recognition. In this case, examples of the passenger state include a direction of sight line, a posture, and the like of each passenger PS. Examples of the biosensor include a heartbeat sensor, a body temperature sensor, and the like which are provided in the handrail 23. In this case, the passenger state is biological information (a heart rate, a body temperature, and the like) of each passenger PS.

The passenger state information to be transmitted to the control device CTR is information that can identify which passenger PS the passenger state is detected for. For example, in the case of the camera, the camera recognizes the passenger place PP on which the passenger PS which is to be subjected to the detection of the passenger state rides, and the information on the passenger place PP is attached to the passenger state information. In the case of the biosensor, the biosensor is placed in a manner corresponding to each passenger place PP, and the information on the passenger place PP is attached to the passenger state information.

In the conversation desire estimation process PCb, the control device CTR estimates the conversation desire level of each passenger based on the passenger state information transmitted from the sensor system SNR. For example, when the posture of the passenger PS is directed toward a direction of the riding space and the sight line of the passenger PS gazes off into space for a while, the control device CTR estimates that the passenger PS has the conversation desire level of "wanting to have a conversation." On the other hand, when the posture of the passenger PS is directed toward outside of the pallet vehicle 1, the control device CTR estimates that the passenger PS has the conversation desire level of "not wanting to have a conversation."

The conversation desire level may be estimated by a larger number of steps, or may be estimated in continuous levels. For example, the level of the feeling of "wanting to have a conversation" may be estimated by five steps. Alternatively, the level of the feeling of "wanting to have a conversation" may be estimated as continuous numerical values from zero (the lowest desire level) to 100 (the highest desire level).

The conversation desire display process PCa and the display devices DD are equivalent to those described in FIG. 4.

By thus adopting the modified aspect, the display indicating the conversation desire level of the passenger PS can be performed without the need for operation of the input device ID by the passenger PS. Furthermore, the burden on the passenger PS can be reduced.

3. Second Embodiment

Hereinafter, there will be described a case where a display system according to a second embodiment is applied to the pallet vehicle 1 in FIGS. 1 and 2. In the following description, the description overlapping with the description of the display system 100 according to the first embodiment will be appropriately omitted.

3-1. Display System According to Second Embodiment

Figure 9:
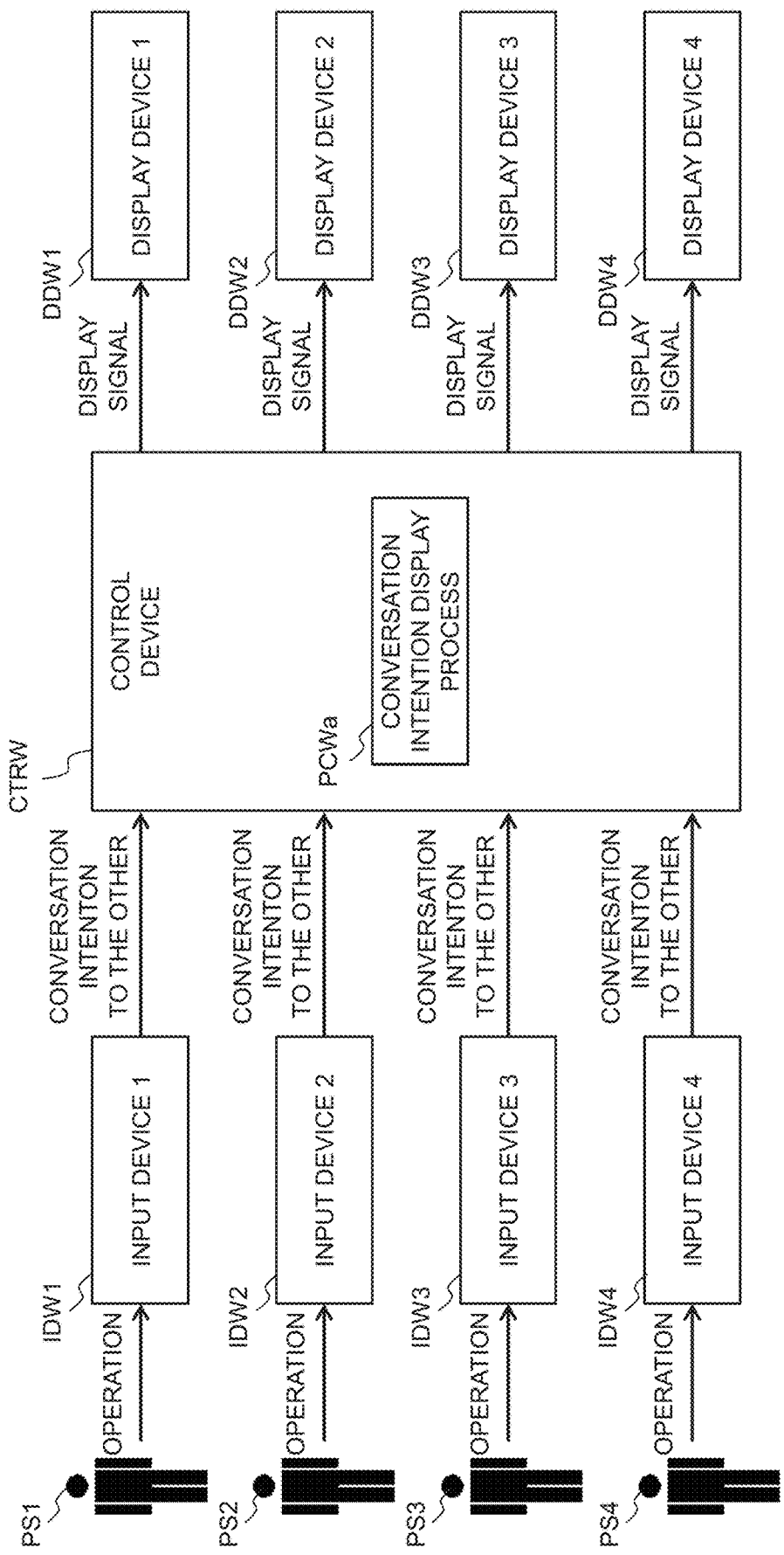
FIG. 9 is a block diagram illustrating a configuration example of a display system according to the second embodiment.

FIG. 9 is a block diagram illustrating a configuration example of a display system 200 according to the second embodiment. The display system 200 includes a plurality of input devices IDW, a control device CTRW, and a plurality of display devices DDW. Each input device IDW and each display device DDW are electrically or wirelessly connected to the control device CTRW so that signals can be transmitted. The display system 200 according to the second embodiment displays conversation intentions among passengers riding in the pallet vehicle 1 on the display devices DDW. Here, the term "conversation intentions among passengers" refer to intentions of the other passengers PS to have a conversation with each of the passengers PS, and represents the feeling of "wanting to have a conversation" or "not wanting to have a conversation" with a certain passenger PS.

In FIG. 9, the reference signs and the number of input devices IDW, display devices DDW, and passengers PS are the same as those in the display system 100 according to the first embodiment which has been described in FIG. 4. The control device CTRW included in the display system 200 may be the same as the control device included in the above-described control unit 12 or may be provided separately.

The input device IDW is a device to accept an input of the conversation intention to the other passengers by an operation of a passenger PS. The input device IDW transmits the input conversation intentions to the other passengers to the control device CTRW.

The input device IDW may be of any form. For example, the input device IDW may be of a form similar to the example of the form of the input device ID described in FIG.

5. Hereinafter, it is assumed that four passengers PS can be accommodated in the pallet vehicle 1, and the four passengers PSi (i=1, 2, 3, and 4) ride on the four passenger places PPi (i=1, 2, 3, and 4), respectively.

When the input device IDW is of a form similar to the first example (A) of the input device ID described in FIG. 5, the input device IDW is of a form as follows, for example. Four input devices IDWi (i=1, 2, 3, and 4) are provided in the handrails 23 in the vicinity of the passenger places PPi (i=1, 2, 3, and 4), respectively. Each of the input device IDWi has three buttons. These buttons one-to-one correspond to passengers PSi riding on the other passenger places PPi, and can be used to switch between conversation intentions of "wanting to have a conversation" and "not wanting to have a conversation" with each of the passengers PSi. The passenger PSi operates the button corresponding to each of the other passengers PSi, whereby the passenger PSi can input the conversation intention to each of the other passengers PSi.

When the input device IDW is of a form similar to the second example (B) of the input device ID described in FIG. 5, the input device IDW is of a form as follows, for example. Four input devices IDWi (i=1, 2, 3, and 4) are provided in the passenger places PPi (i=1, 2, 3, and 4), respectively. Each of the input devices IDWi has three pedals. These pedals one-to-one correspond to passengers PSi riding on the other passenger places PPi, and can be used to switch between conversation intentions of "wanting to have a conversation" and "not wanting to have a conversation" with each of the passengers PSi. The passenger PSi operates the pedal corresponding to each of the other passengers PSi, whereby the passenger PSi can input the conversation intention to each of the other passengers PSi.

When the input device IDW is of a form similar to the third example (C) of the input device ID described in FIG. 5, the input device IDW is of a form as follows, for example. HMI units 40 provided in the vicinity of the passenger places PPi (i=1, 2, 3, and 4) function as the input devices IDWi (i=1, 2, 3, and 4), respectively. On each of the HMI units 40 (input devices IDWi), the options of "wanting to have a conversation" and "not wanting to have a conversation" with each of the passengers PSi riding on the other passenger places PPi are displayed. The passenger PSi selects from the options with respect to each of the other passengers PSi, whereby the passenger PSi can input the conversation intention to each of the other passengers PSi.

As other examples of the input device IDW, a terminal (smartphone or the like) owned by the passenger PS may be used as the input device IDW. Each passenger PS inputs the conversation intention to the other passengers PSi by operating the terminal (input device IDW) owned by himself or herself.

Note that the conversation intention to the other passengers PSi may be input in a larger number of steps according to the level of the intention. Alternatively, the conversation intention can be input as continuous levels.

Referring again to FIG. 9, the control device CTRW performs a conversation intention display process PCWa, and generates and outputs a display signal for performing a display on the display device DDW. More specifically, the processor of the control device CTRW reads the programs related to the conversation intention display process PCWa from the memory and performs the conversation intention display process PCWa based on the conversation intention among passengers transmitted from the input device IDW and stored in the memory. Then, a display signal for performing the display indicating the conversation intention among passengers is generated, and the display signal is output to the corresponding display device DDW. Here, the display signal is generated so that the conversation intention among passengers indicated by the display on the display device DDW correspond to the conversation intention among passengers transmitted from the input device IDW.

The control device CTRW may always perform a display by repeatedly performing the conversation intention display process PCWa at every predetermined control cycle or may perform a display by performing the conversation intention display process PCWa at a specific timing.

The display device DDW performs a display according to the display signal output from the control device CTRW. The display devices DDW may be of any form and perform any display that can indicate the conversation intentions among passengers. However, the display device DDW is configured so that only a certain passenger PSi corresponding to the display devices DDW can visually recognize the display on the display device DDW.

One example of the display device DDW is of a form similar to the third example (C) of the display device DD described in FIG. 7. That is, each of the HMI units 40 functions as the display device DDW. In the following description, it is assumed that the display devices DDW provided in the vicinity of the passenger places PPi (i=1, 2, 3, and 4) are referred to as the display devices DDWi (i=1, 2, 3, and 4). It is assumed that the passengers PSi (i=1, 2, 3, and 4) ride on the passenger place PPi (i=1, 2, 3, and 4).

Figure 10:
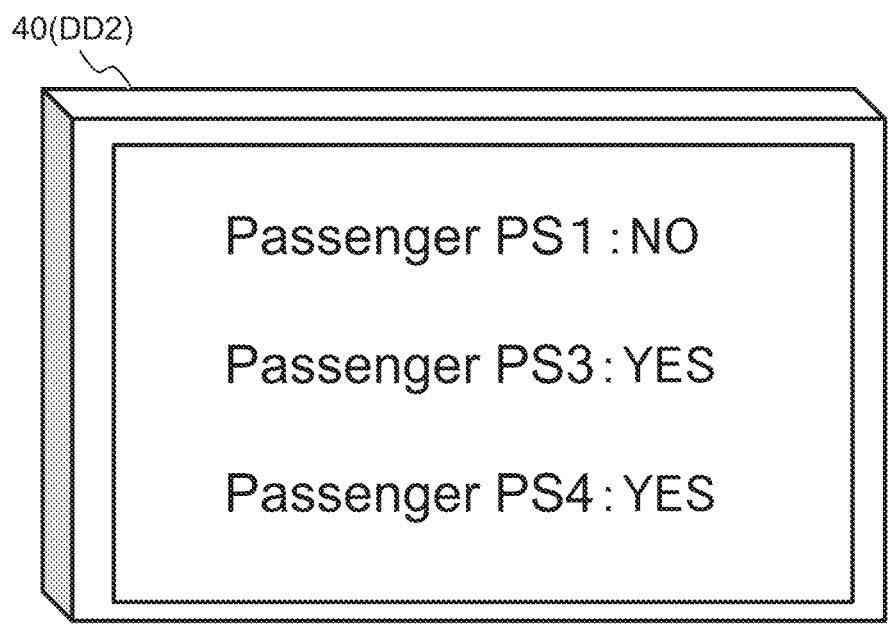
FIG. 10 illustrates an example of the display on the HMI unit provided in the vicinity of the passenger place according to the second embodiment

The HMI unit 40 (display device DDWi) provided in the vicinity of the passenger place PPi displays the conversation intention to the passenger PSi. FIG. 10 illustrates an example of the display on the HMI unit (display device DDW2) provided in the vicinity of the passenger place PP2. The HMI unit (display device DDW2) provided in the vicinity of the passenger place PP2 performs the display indicating the conversation intention of the other passengers PSi (i=1, 3, and 4) to the passenger PS2. In the example illustrated in FIG. 10, "YES" is displayed in the column of the passenger PSi having the conversation intention of "wanting to have a conversation" with the passenger PS2 and "NO" is displayed in the column of the passenger PSi having the conversation intention of "not wanting to have a conversation" with the passenger PS2. That is, the passengers PS3 and the passenger PS4 have the conversation intention of "wanting to have a conversation" with the passenger PS2, and the passenger PS1 has the conversation intention of "not wanting to have a conversation" with the passenger PS2. Note that the display indicating the conversation intention is not limited to the display illustrated in FIG. 10, and may be shown using colors, characters, signs, numerical values, or the like, or a combination thereof.

Note that each of the HMI units 40 (display devices DDWi) is configured so that only the passenger PSi can visually recognize the display. For example, the peep prevention process is performed for the HMI unit 40 (display device DDWi). That is, a certain passenger PS corresponding to a display device DDWi is a passenger PSi riding on the passenger place PPi provided with the display device DDWi.

As other examples of the display device DDW, a terminal (smartphone or the like) owned by the passenger PS may be used as the display device DDW. In this case, on the terminal (display device DDW) owned by each of the passengers PSi, the display indicating the conversation intentions to the passenger PSi is displayed. In this case, for example, the display is equivalent to that described in FIG. 10. In addition, in this case, a certain passenger PS corresponding to the display device DDWi is a passenger PSi owning the terminal as the display device DDWi.

The display device DDW may perform a display indicating the conversation intention among passengers of only some of the passengers PS riding in the pallet vehicle 1. For example, the display device DDW2 displaying the conversation intention to the passenger PS2 displays the conversation intention of the passenger PS1 and the passenger PS3 to the passenger PS2, but may be configured not to display the conversation intention of the passenger PS4 to the passenger PS2.

In this way, the display system 200 according to the second embodiment enables the passenger to know the conversation intention of the other passengers PS to himself or herself. In addition, it is possible to inform the other passengers PS about the conversation intention of himself or herself. This can provide a motivation to start a conversation among passengers riding together in the vehicle. On the other hand, it is also possible to inform the other passengers PS about an intention of "not wanting to have a conversation."

3-2. Modified Example

The display system 200 according to the second embodiment may adopt a modified aspect as follows.

Figure 11:
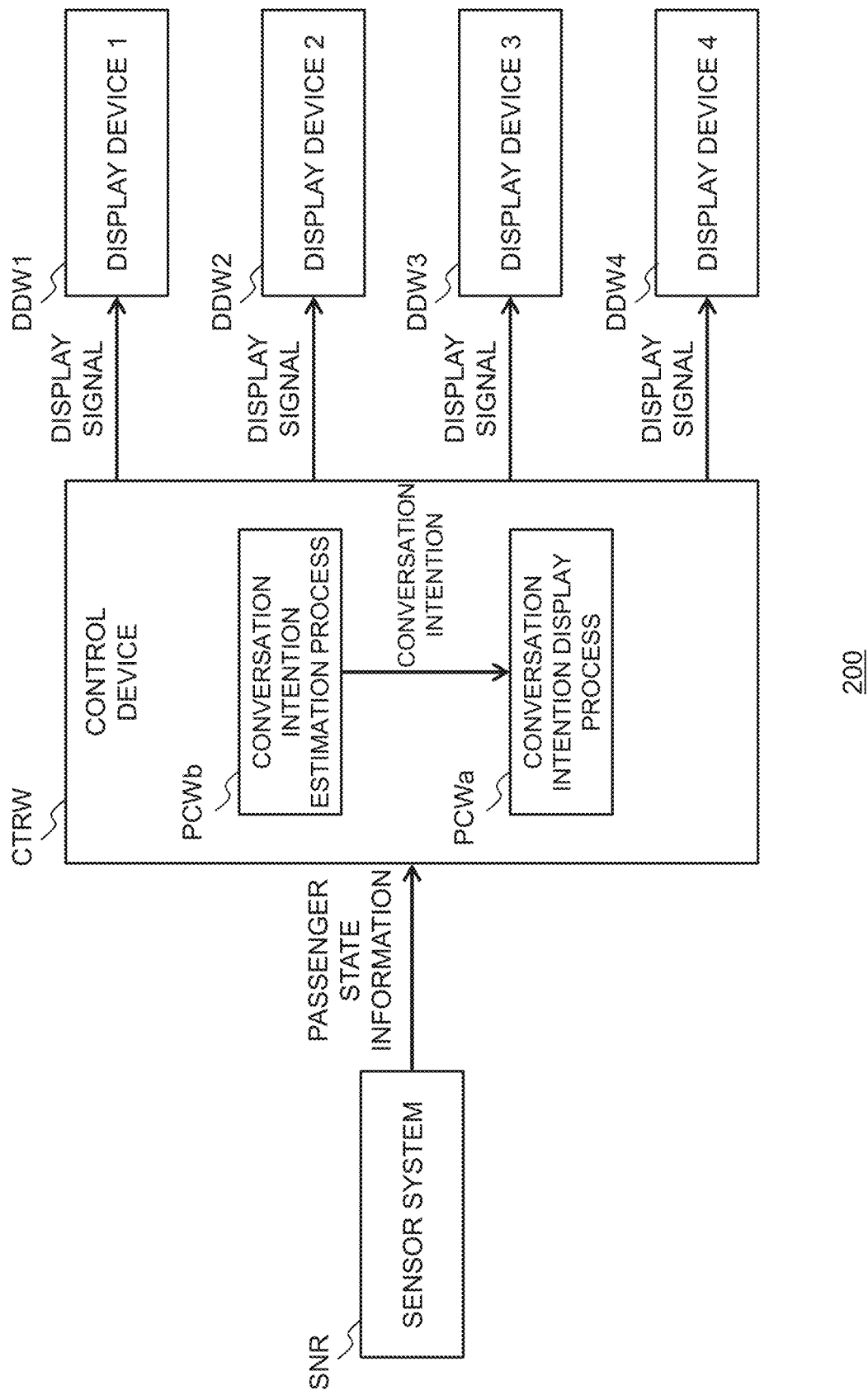
FIG. 11 is a block diagram illustrating a configuration example of a display system according to a modified example of the second embodiment.

The display system 200 according to the second embodiment may be configured to estimate the conversation intention among passengers. FIG. 11 is a block diagram illustrating a configuration example of a display system 200 according to a modified example of the second embodiment. The display system 200 according to the modified example of the second embodiment is different from the configuration example illustrated in FIG. 8 in that no input devices IDW are provided and a sensor system SNR is provided. In addition, the control device CTRW performs the conversation intention estimation process PCWb. Here, the sensor system SNR and the passenger state information are equivalent to those described in FIG. 8.

In the conversation intention estimation process PCWb, the control device CTRW estimates the conversation intentions among passengers based on the passenger state information transmitted from the sensor system SNR. For example, when the sight line of the passenger PS2 is directed toward the passenger PS3, it is estimated that the passenger PS2 has a conversation intention of "wanting to have a conversation" with the passenger PS3. The conversation intentions may be estimated by a larger number of steps, or may be estimated in continuous levels.

The conversation intention display process PCWa and the display device DDW are equivalent to those described in FIG. 8.

By thus adopting the modified aspect, the display indicating the conversation intention among passengers can be performed without the need for operation of the input device IDW by the passenger PS. Furthermore, the burden on the passenger PS can be reduced.

4. Effect

As described above, the display systems 100 and 200 according to the embodiments can provide a motivation to start a conversation among passengers in view of conversation intentions of each passenger. Although the description has been made in the case where the display systems 100 and 200 according to the embodiments are applied to the pallet vehicle 1, the same effect can be obtained when the display systems 100 and 200 are suitably applied to another form of vehicle that can accommodate a plurality of passengers.

What is claimed is:

1. A display system which is mounted on a vehicle capable of accommodating a plurality of passengers, the display system comprising:
   a plurality of display devices; and
   a control device configured to perform a display process related to the plurality of display devices, wherein
   the vehicle comprises a floor with a plurality of defined areas for the plurality of passengers to ride,
   the plurality of display devices is disposed corresponding to the plurality of defined areas, respectively, and
   the display process comprises displaying a conversation desire level of a target passenger riding on each of the plurality of defined areas on a display device corresponding to the target passenger, the conversation desire level being a level of desire for conversation in the vehicle, and the conversation desire level is represented as continuous numerical values from zero to 100, wherein:
   each of the plurality of display devices is configured to allow all the plurality of passengers in the vehicle to visually recognize a display thereof,
   the vehicle comprises a plurality of handrails on the floor,
   the plurality of handrails is disposed corresponding to the plurality of defined areas, respectively, and
   each of the plurality of display devices is installed into a grip portion of a handrail corresponding thereto.

* * * * *